United States Patent
Crupi

(10) Patent No.: US 10,946,941 B2
(45) Date of Patent: Mar. 16, 2021

(54) PROCESS FOR CONTROLLING THE ROLL AND/OR PITCH MOTION OF A SHIP WITH NULL OR LOW SHIP SPEED

(71) Applicant: PSC Engineering S.R.L., Turin (IT)

(72) Inventor: Santino Crupi, Turin (IT)

(73) Assignee: PSC Engineering S.R.L., Turin (IT)

( * ) Notice: Subject to any disclaimer, the term of this patent is extended or adjusted under 35 U.S.C. 154(b) by 0 days.

(21) Appl. No.: 16/330,235

(22) PCT Filed: Aug. 30, 2017

(86) PCT No.: PCT/IT2017/000183
§ 371 (c)(1),
(2) Date: Mar. 4, 2019

(87) PCT Pub. No.: WO2018/055649
PCT Pub. Date: Mar. 29, 2018

(65) Prior Publication Data
US 2019/0210697 A1 Jul. 11, 2019

(30) Foreign Application Priority Data

Sep. 20, 2016 (IT) .................. 102016000094283

(51) Int. Cl.
*B63B 39/06* (2006.01)
*B63B 39/00* (2006.01)
*G05D 1/08* (2006.01)

(52) U.S. Cl.
CPC .............. *B63B 39/06* (2013.01); *B63B 39/00* (2013.01); *G05D 1/0875* (2013.01)

(58) Field of Classification Search
CPC ......... B63B 39/00; B63B 39/04; B63B 39/06; G05D 1/08; G05D 1/0875
USPC .................... 114/121, 122, 126, 275; 701/21
See application file for complete search history.

(56) References Cited

U.S. PATENT DOCUMENTS

| | | | | | |
|---|---|---|---|---|---|
| 3,687,100 | A | * | 8/1972 | Larsh | G87S 114/126 |
| 3,842,777 | A | * | 10/1974 | Larsh | B63B 39/06 114/126 |
| 4,023,516 | A | * | 5/1977 | Bennett | B63B 39/06 114/126 |
| 4,273,063 | A | * | 6/1981 | Berne | B63B 39/06 114/126 |
| 4,777,899 | A | * | 10/1988 | Bettcher, Jr. | B63B 39/06 114/126 |
| 7,263,942 | B1 | * | 9/2007 | Dobashi | B63B 39/06 114/126 |
| 7,451,715 | B2 | * | 11/2008 | Koop | B63B 39/06 114/126 |

(Continued)

FOREIGN PATENT DOCUMENTS

| | | |
|---|---|---|
| EP | 1577210 | 9/2005 |
| EP | 1992559 | 11/2008 |
| EP | 2910463 | 8/2015 |

*Primary Examiner* — Lars A Olson
(74) *Attorney, Agent, or Firm* — Macheledt Bales LLP; Jennifer L. Bales

(57) ABSTRACT

A process is described for controlling the roll motion of a ship, with null or low ship speed, through at least one stabilizing fin. The process comprises the following steps: starting the movement of the stabilizing fin when the roll motion starts; impressing a motion law of the stabilizing fin depending on the roll rate; and ending the movement of the stabilizing fin when the roll motion ends.

16 Claims, 2 Drawing Sheets

(56) References Cited

U.S. PATENT DOCUMENTS 10,259,544 B2 * 4/2019 Venables ................ B63B 39/06

* cited by examiner

PROCESS FOR CONTROLLING THE ROLL AND/OR PITCH MOTION OF A SHIP WITH NULL OR LOW SHIP SPEED

BACKGROUND OF THE INVENTION

1) Field of the Invention

The present invention refers to a process for controlling the roll and/or pitch motion of a ship, with null or low ship speed.

In particular, the present invention refers to a process for determining the position of the fins for reducing the roll and/or pitch angle of a ship, anchored with null speed, or navigating with low speed.

2) Background Art

The reduction of the roll motion of a ship with null or low ship speed is obtained by rotating the fins in order to create a roll motion capable of braking the roll motion of the ship. It is well known, in fact, that the force, with null or low ship speed, is developed from the rotation speed of the fins or of other devices.

The prior art is represented by patent EP2669177B1, dealing with a process for controlling a stabilizing fin for stabilizing the anti-roll of ships unmoving and anchored, comprising the steps of: detecting at least one identifying value for the ship roll; estimating the expected ship roll oscillation depending on the detected value; determining a trajectory for moving the stabilizing fin depending on the expected roll; and controlling the movement of the stabilizing fin depending on the trajectory.

The process of patent EP2669177B1 allow modelling the ship roll oscillation through a sinusoidal wave and determining a trajectory for moving the stabilizing fin depending on the estimation of the destabilizing moment of the sea and on the stabilizing moment of the fin.

In particular, the process of patent EP2669177B1 allows evaluating at which speed it is convenient to move the fin in order to have a stabilizing effect, by progressively choosing the most adequate type of trajectory to avoid having to brake the fin when the stabilizing contribution becomes negative. The instant in which the movement of the fin is applied is the one in which there is the passage of the roll from zero or scarcely before.

In general, the solution adopted by all manufacturers of fins allows making a fin stroke when the ship roll angle passes from value zero, namely when the roll rate assumes its maximum value, or astride of this value. The fins are moved not continuously, so-called bang-bang, or kicking, from an end to the other, dissipating the maximum roll energy to be able to have the maximum dampening.

In the current state of the art, by moving the stabilizing fin in the maximum roll rate zone, namely with a roll angle around 0° corresponding to an horizontal ship, the ship stops, if the action of the fins is sufficient, when the roll angle is not in a stable balance point. The ship is therefore compelled to move by going back towards the stable balance point. In this way, the roll angle tends to go along the opposite direction, and to require a further correction to the fins. This implies the practical impossibility of stabilizing the small motions creating at the same time a motion and control run after, wherein the ship is compelled to still perform a small roll angle to be able to go back to its equilibrium, however without maximizing the dampening and, even less, the comfort.

Moreover, the non-continuous motion, the so-called bang-bang, or kicking, of the fins, in the area with maximum roll rate or next to the area with maximum kinetic energy, generates a resisting roll motion which can be perceived by a passenger aboard the ship, with an annoying transverse jolt, known as jerk and well described in literature, when the fins start their stroke and, often, also when the fins stop.

SUMMARY OF THE INVENTION

Object of the present invention is solving the above prior art problems, by providing a process to allow dissipating the roll energy of a ship, without applying the commonly used relationship, according to which: a maximum comfort and a maximum dampening of the roll motions of a ship correspond to the maximum energy dissipation.

A further object is being able to abandon a process following such commonly used relationship. Namely: moving the fin at the passage of the roll from zero or next to zero.

A further object is providing a process which allows stopping the ship roll angle on zero or in its stable balance point, when the moment developed by the fin is enough to counteract the roll movement.

A further object is providing a process which allows creating an action of the fins free from transverse jolts, with all advantages for the comfort.

A further object is providing a process which allows a control action capable of being exhausted in a stable balance point of the roll instead of starting in such point or next to such point.

The above and other objects and advantages of the invention, as result from the following description, are obtained with a process for controlling the roll motion of a ship, with null or low ship speed, as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described without departing from the scope of the invention as appears from the enclosed claims.

The present invention will be better described by some preferred embodiments thereof, provided as a non-limiting example, with reference to the enclosed Figures, in which:

DETAILED DESCRIPTION OF PREFERRED EMBODIMENTS

Figure 1:
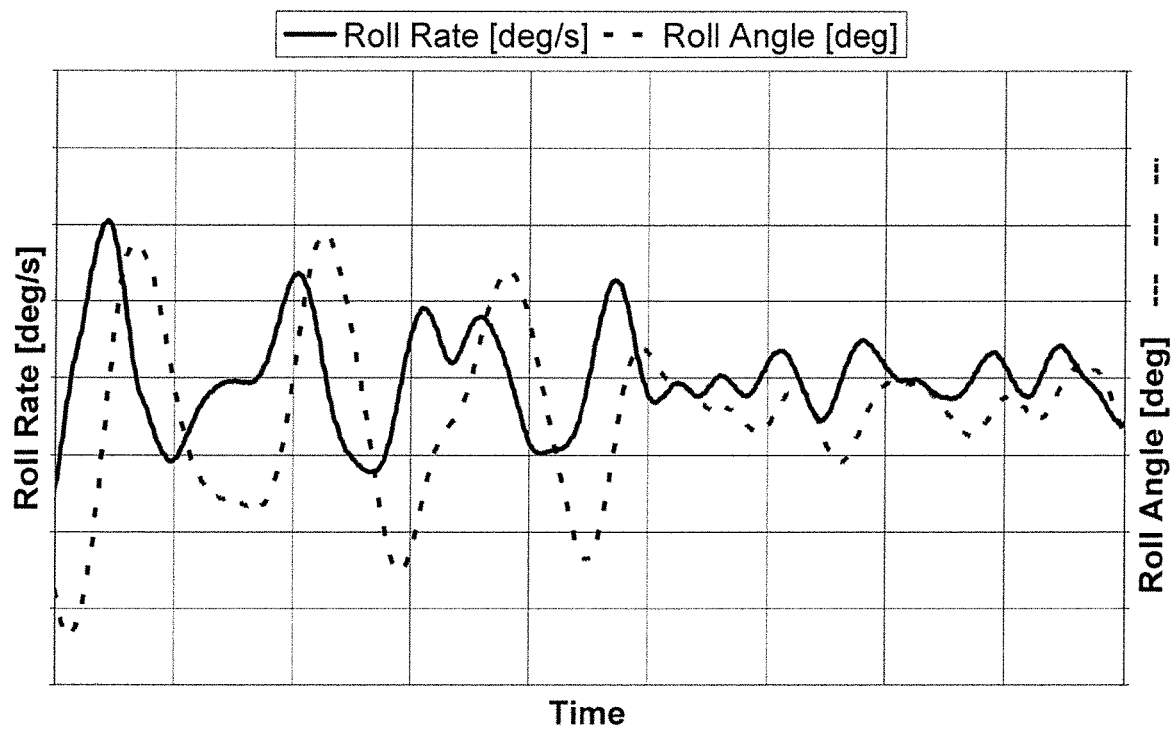
FIG. 1 shows a time graph of the behavior of the roll rate, Roll Rate, and of the roll angle, Roll Angle, with null or low speed of a ship, according to the present invention.

With reference to the Figures, it is possible to note that a process for controlling the roll motion of a ship, with null or low ship speed, through at least one stabilizing fin, comprises the following steps:

a. starting the movement of the stabilizing fin when the roll motion starts;
b. impressing a motion law of the stabilizing fin depending on the roll rate;
c. ending the movement of the stabilizing fin when the roll motion ends.

In particular, the movement of the stabilizing fin is stopped next to any position reached by the stabilizing fin itself.

As a non-limiting example, the stabilizing fin is moved, with a speed proportional to the roll rate, to be able to create a stabilizing moment gradual and opposite to the roll motion.

Next to a null roll rate, the stabilizing fin stops immediately and keeps the reached position, whichever the reached position is.

Next to a non-null roll rate, the stabilizing fin begins again moving, starting from the reached position in a previous cycle for controlling the ship roll motion.

The motion law of the stabilizing fin is of a continuous type.

Preferably, the motion of the stabilizing fin is oscillating with respect to a rotation axis.

If a maximum inclination angle is reached, the stabilizing fin remains unmoving until the roll rate changes direction, to be then able to start moving along the opposite direction.

Advantageously, such process can be applied to devices like fins, Magnus effect, gyroscopes, moving masses, active pendulums, boxes with liquid displacement, external boxes placed in water, roll stabilization with helm, roll stabilization with azimuth propeller or propulsion. According to the state of the art, all these devices are activated at the roll passage from zero or near to it.

Moreover, such process can be transferred for defining the control of the pitch stabilization when anchored or at a low speed.

The process for controlling the roll motion with zero or low ship speed of the present invention, allows obtaining the stated objects.

The maximum dampening of roll, and the best comfort, are obtained if the fin starts moving when the roll movement begins, and if the fin goes on moving depending on the roll rate, not only in the area with maximum roll rate, passage of the roll from zero, or balance point, but always when the roll moves, non-null roll rate.

According to the process of the present invention, the fin is moved if the ship roll rate is not null. In particular, the fin moves with a rotation speed depending on the roll rate of the ship. Therefore, if the roll motion developed by the fin is enough, or the initial roll angle is small enough, the movement of the fin is capable of stopping the ship roll angle on zero, or in the stable balance roll point. The fin is blocked at the reached angle when the roll rate assumes value zero, constant roll angle. Since the null roll position is a position of stable balance, the ship remains there till external roll moments move it. Moreover, moving the fins next to the roll motion, depending on the roll rate, creates an action of the fins which does not create jolts, an advantage for comfort.

The process of the present invention allows stopping the ship in its stable balance point removing the need of the following oscillation.

The roll stabilization with zero ship speed, when anchored, obtained with the stabilizing fins which move with a rotation speed proportional to the ship roll rate, allows obtaining a roll dampening which is greater than the other currently used methods and with a smaller workload of the fins. Moreover, there are no unpleasant transverse jolts, the unpleasant jerk, which are instead present in bang-bang or kicking systems, and in all method actuating the fins when the roll passes or next to its passage from zero. The bang-bang systems, to avoid having these unpleasant transverse jerks, must limit the control action producing a roll dampening lower than it is possible to obtain with the same number of fins or increase the size of installed fins to reduce the need of their movement.

The process of the present invention is applied to the stabilization of roll of the ships with null or low ship rate. However, such process can be extended in general to any surface or device which uses wing components, such as fins, flapping fins DMS, and systems with Magnus effect.

The process of the present invention is analytically supported by the following mathematical algorithm.

Given:
$\delta_{fin}(t)$ the fin angle in time,
p(t) the ship roll rate,
functionOf (p(t) a non-linear function of the roll rate, and
$K_p$ a gain factor,
the component of the roll control when anchored and with low ship rate is:

$$\frac{d}{dt}\delta_{fin}(t) = functionOf(p(t)) \tag{1}$$

which, in the simplest embodiment, but however exceptionally efficient, is proportional to the roll rate through a gain:

$$\frac{d}{dt}\delta_{fin}(t) = K_p * p(t) \tag{2}$$

The fin actuation speed is proportional, or a non-linear function, to the roll rate. The force developed by the fin depends on its rotation speed. Therefore, as far as the ship has a non-null roll rate, the fin rotates, creating a roll motion which opposes the ship roll motion. When the ship roll rate is null, the fins remain at their reached value (constant value) waiting to start again moving to counteract the roll motion. The fins can be stopped in a non-null position, even different for each fin, if it is independently managed. The movement of the fins with non-null mean value is a peculiarity of the process of the invention.

Also the gain $K_p$ can be simply a coefficient or can be determined in a more complex way depending on sea status, roll motion width, maximum fin speed, fin stroke, fin lift, or other environmental or comfort parameters.

Generally, the fin is drive at an angle. The equivalent form, which allows obtaining the fin angle, is:

$$\delta_{fin}(t) = \int K_p * p(t) * dt \tag{3}$$

The integration limits are the maximum and minimum fin values. When the roll rate is null, the roll angle is balanced, or at a maximum or minimum, the fin stops and starts again moving when the ship again gets the roll motion.

$$\delta_{fin}(t) = \int_{\delta_{min}}^{\delta_{max}} K_p * p(t) * dt \tag{4}$$

The regulation law (4) allows obtaining the maximum levels of roll dampening, with the same fin size. This situation is of a continuous type, namely not bang-bang or kicking, and cancels any hydrodynamic jerk which create fastidious roll accelerations, namely transverse accelerations perceived from the passengers who are on the various ship decks.

Applying a fin stroke around the maximum roll rate, as currently performed, means suddenly adding a roll motion which distorts the angular speed curve in its maximum point.

On the other hand, an application of the continuous dampening moment, starting from when the roll rate is small, does not generate this phenomenon and ensures maximum comfort with maximum roll dampening capability.

Moreover, since this is a continuous solution, such motion law allows dampening also the small roll motions, without leaving any roll range uncovered. With the same fins, ship and sea, this process ensure a greater roll dampening, with a smaller fin workload and with less wear of the global system. The evaluation of fin workload, for stabilizing when anchored, must be performed with the computation of the standard deviation of the fin speed and not with the standard deviation of the fin angle, as usually happens.

With this control, it is also necessary to get accustomed to apparent anomalies with respect to what one is accustomed to observe.

In fact, the fins can be stopped at a non-null angle, in agreement for those on the same part of the ship and in opposition on the opposite side, when they are driven together. If the fins are driven separately, in order to take into account the specific conditions, each fin can assume a different value. The mean fin value is zero with the current regulation methods, while with the process of the invention the fins, in the stabilization when anchored or with a low ship rate, can stop at any angle and not necessarily on zero, when the roll assumes a null or balance value.

The described roll control component is efficient particularly in the stabilization when anchored, but also with a low ship speed. In fact, at low speed, it is possible to develop a roll torque capable of reducing the ship roll motions when the fin lift, due to the advancement of the ship and to the classical lift (with attack angle) is small.

An equivalent solution is moving the fins with an angular acceleration function of the angular roll acceleration.

Another equivalent solution is taking into account the relative maximum, or minimum, of the roll angle, within a half-period, and creating a new control quantity: displacement angle from max roll; or: displacement angle from min roll. This allows obtaining a regulator as increase, or decrease, of the fin by an amount proportional to the maximum, or minimum, roll displacement. The required fin angle is equal to the value of the required angle in the relative maximum, or minimum, roll point, summed to the difference between instantaneous roll and relative maximum, or minimum, roll, multiplied by Kp.

Namely, from a roll reversal point, identified at the time in which it occurs, till the next reversal point, relative maximum or relative minimum, the requested fin angle is:

$$\delta_{fin}(t) = \delta_{fin}(t_{inversione}) + \int_{t_{inversione}}^{t} K_p * p(t) * dt = \quad (5)$$

$$\delta_{fin}(t_{inversione}) + K_p * (\phi(t) - \phi(t_{inversione}))$$

wherein $\phi(t)$ is the roll angle in time.

This solution, even if theoretically equivalent, is more complicated to implement. The implementation with roll rate integral is very simple and efficient. Moreover, it can be used for determining the gain according to design methods of the theory of controls. Sometimes, the other form can be preferred for other reasons: roll sensor noise lower than roll rate integral noise, non-inertial roll sensor, or the roll rate integral is convenient when the roll sensor is inertial and the roll rate is particularly accurate.

With this stabilization process, the small motions of big ships are dampened with high dampening levels when anchored, and in particular, the dampening increases when the roll angle width decreases. Currently, the stabilizing systems when anchored are not able to reduce the small roll motions of the ship and have, in fact, a decay of the dampening when the roll angle decreases, creating a clear paradox: when small developed forces are necessary, the fins are less capable of dampening the roll with respect to higher roll motions.

This innovation allows exceptionally reducing the small roll oscillations, particularly important on big ships. On big yachts, the small motions are the cause of a severe lack of comfort. A roll oscillation only by ±0.5° generates, in a lateral position for a ship 20 m wide, a vertical oscillation of over 17 cm. The control process of the invention is capable of dampening these oscillation by values greater than 90%, due to its continuous functionality. This innovation allows to dampening roll movement of ship with little roll period (under six or seven seconds); actually, with bang-bang method, the roll damping of this ship is very low or negative.

The process can be applied to a roll stabilization when anchored or with low ship speed and to the pitch stabilization when anchored or with low ship speed. It is applied to all devices: fins, flap, flapping-fins (DMS), Magnus effect, gyroscopes, moving masses, active pendulums, boxes with liquid displacement, external boxes placed in water, roll stabilization with helm, roll stabilization with azimuth propeller or propulsion.

It is applied to the stabilization of roll, pitch and jolt of immersed bodies, and of floating platforms, and can be used in any regulation, through the control component 'rate integral' of the considered quantity: roll rate integral if the quantity to be regulated is roll, pitch rate integral if the quantity to be regulated is pitch, heave speed integral if the quantity to be regulated is heave.

In the practical implementation, it is necessary to take into account also the maximum angular rate of the fin, MaxFinRate, or of the control in general, and possibly the maximum angular acceleration.

The implementing formula becomes:

$$\frac{d}{dt}\delta_{fin}(t) = [functionOf(p(t))]_{-MaxFinRate}^{+MaxFinRate} \quad (6)$$

for the linear solution:

$$\frac{d}{dt}\delta_{fin}(t) = [K_p * p(t)]_{-MaxFinRate}^{+MaxFinRate} \quad (7)$$

The fin angle control becomes:

$$\delta_{fin}(t) = \int_{\delta_{min}}^{\delta_{max}} [K_p * p(t)]_{-MaxFinRate}^{+MaxFinRate} * dt \quad (8)$$

Figure 2:
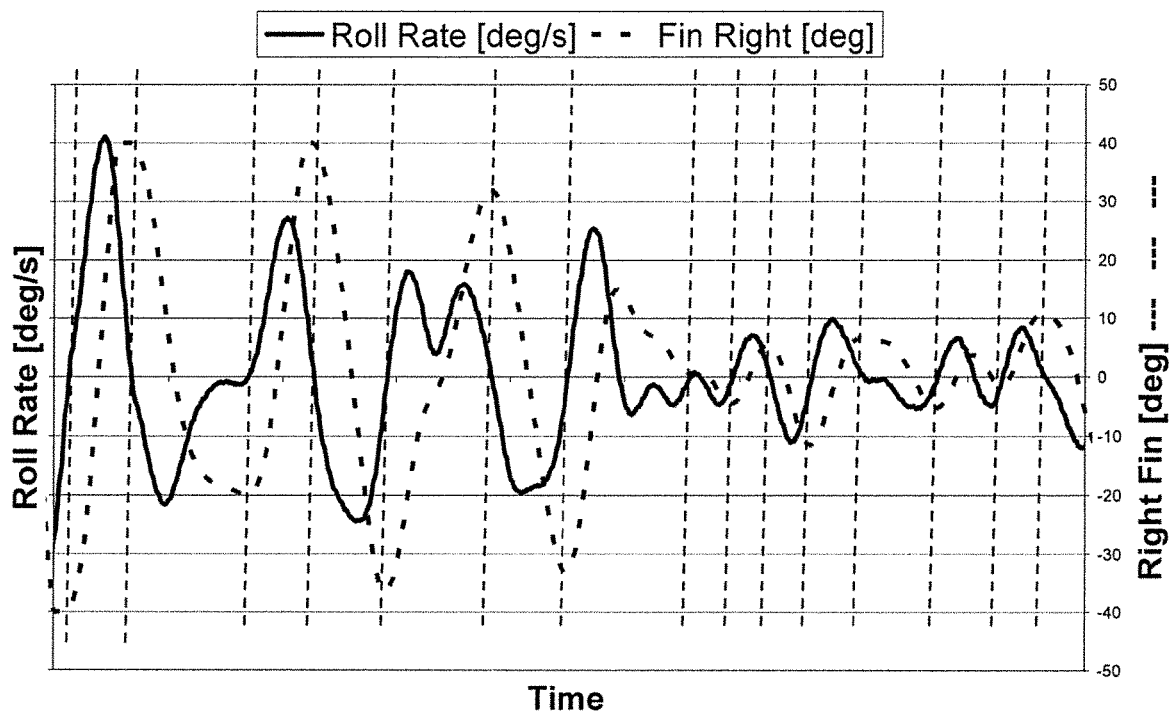
FIG. 2 shows a time graph of the behavior of the roll rate, Roll Rate, and of the starboard fin angle, Fin DEG, according to the present invention.

The process of the present invention, implemented through the above described algorithm, allows obtaining a behavior of the rotation angle of the stabilizing fin like the one shown in FIG. 2.

Figure 3:
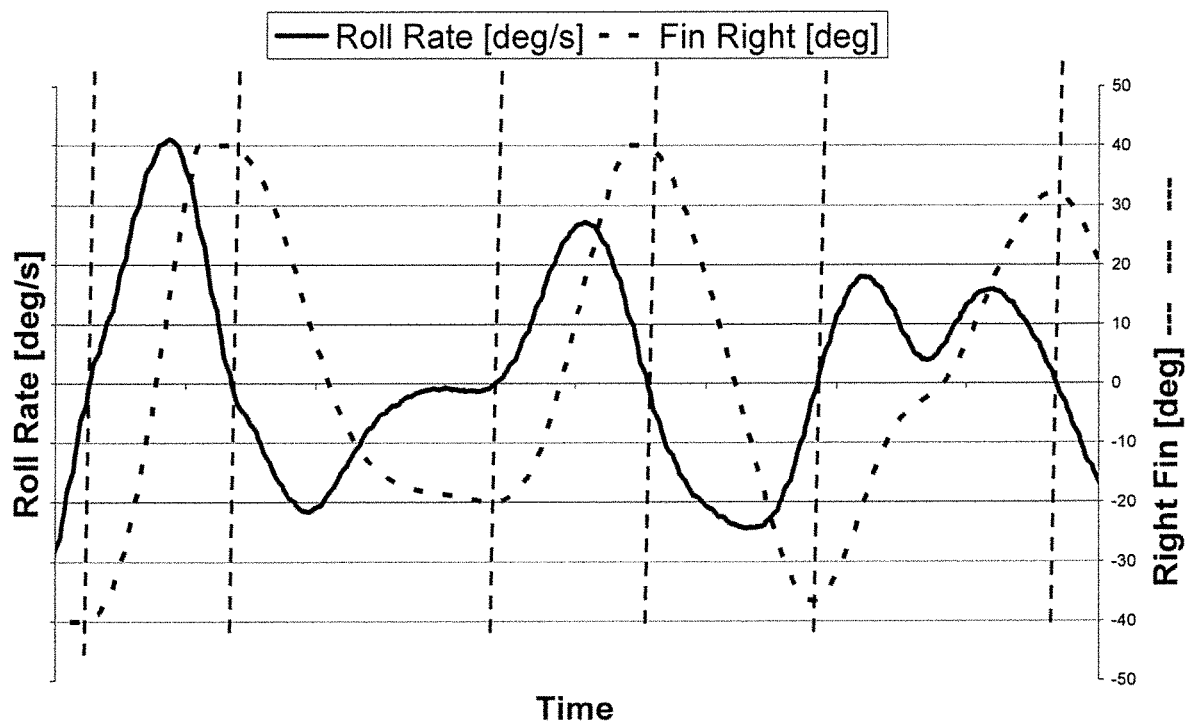
FIG. 3 shows an enlarged portion of the time graph of the previous Figure.
Figure 4:
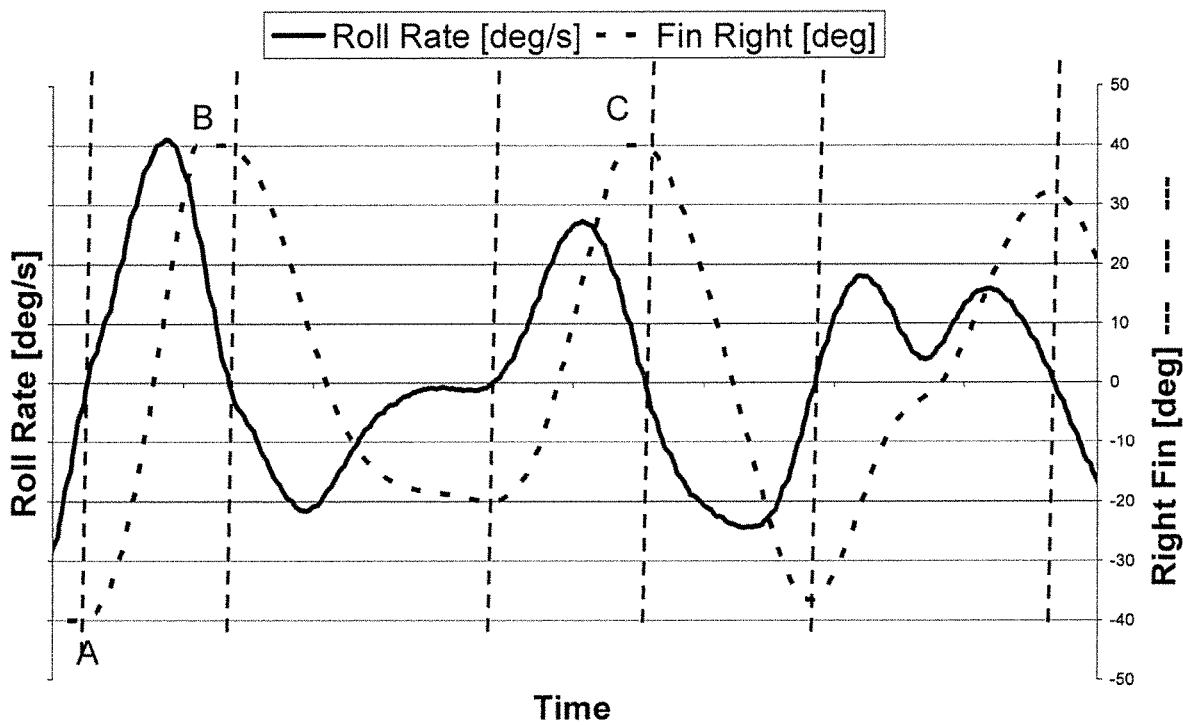
FIG. 4 shows an enlarged portion of a time graph referred to part of the process where there is the limitation of the maximum inclination angle of the stabilizing fin.

With reference to FIG. 2, the fin moves when the roll rate is not null. The vertical lines, FIGS. 2, 3 and 4, show the point in which the roll rate is zero and the fin is unmoving. In this point, the fin starts moving with the described stabilization process.

The process of the present invention refers to practical embodiments of: software, in case of computer systems or PLCs; hardware, in case of analogue circuit systems; physical devices, in case of embodiments through pneumatic or mechanic regulators.

What is claimed is:

1. A method of controlling a roll motion of a ship, through at least one stabilizing fin, characterized in that it comprises the following steps:
   a. starting a movement of the stabilizing fin when the roll motion starts;
   b. controlling an angular rate of the stabilizing fin directly in response to a roll rate of the ship;
   c. ending the movement of the stabilizing fin when the roll motion ends.

2. The method of controlling the roll motion of a ship according to claim 1, further including the step of selectively stopping the movement of the stabilizing fin at any position reached by the stabilizing fin.

3. The method of controlling the roll motion of a ship according to claim 1, further including the step of moving the stabilizing fin with a rate proportional to the roll rate, to create a gradual stabilizing movement opposed to the roll motion.

4. The method of controlling the roll motion of a ship according to claim 1, further including the steps of stopping the stabilizing fin given a null roll rate, and maintaining its stopped position.

5. The method of controlling the roll motion of a ship according to claim 4, further including the step of restarting movement of the stabilizing fin given a not null roll rate, starting from the stopped position.

6. The method of controlling the roll motion of a ship according to claim 1, wherein the motion of the stabilizing fin is of a continuous type.

7. The method of controlling the roll motion of a ship according to claim 1, characterized in that the motion of the stabilizing fin is oscillating with respect to a rotation axis.

8. The method of controlling the roll motion of a ship according to claim 7 wherein, when a selected maximum inclination angle is reached, the stabilizing fin remains unmoving until the roll motion changes direction, and wherein, once the roll motion changes direction, the stabilizing fin starts moving in an opposite direction.

9. The method of controlling the roll motion of a ship according to claim 1 further including steps for pitch stabilizing including the steps of
   a. starting a movement of a stabilizing fin when a pitch motion starts;
   b. controlling an angular rate of the stabilizing fin directly in response to a pitch rate;
   c. ending the movement of the stabilizing fin when the pitch motion ends.

10. The method of controlling the roll motion of a ship according to claim 3, further including the steps of stopping the stabilizing fin given a null roll rate, and maintaining its stopped position.

11. The method of controlling the roll motion of a ship according to claim 10, further including the step of restarting movement of the stabilizing fin given a not null roll rate, starting from the stopped position.

12. The method of controlling the roll motion of a ship according to claim 3, characterized in that the motion of the stabilizing fin is oscillating with respect to a rotation axis.

13. The method of controlling the roll motion of a ship according to claim 1, wherein, when a selected maximum inclination angle is reached, the stabilizing fin remains unmoving till the roll motion changes direction, and wherein, once the roll motion changes direction, the stabilizing fin starts moving in an opposite direction.

14. The method of controlling the roll motion of a ship according to claim 1, wherein step (a) starts the movement of the stabilizing fin well under one second after the roll motion begins.

15. The method of controlling the roll motion of a ship according to claim 1, wherein the method is performed while the ship is at null ship speed with respect to sea water.

16. A method of controlling at least one of a roll, pitch, or heave motion of a ship, through at least one stabilizing fin, characterized in that it comprises the following steps:
   a. starting a movement of the stabilizing fin when the roll, pitch, or heave motion starts;
   b. controlling an angular rate of the stabilizing fin directly in response to a roll, pitch, or heave rate of the ship;
   c. ending the movement of the stabilizing fin when the roll, pitch, or heave motion ends.

* * * * *